United States Patent Office 2,818,278
Patented Dec. 31, 1957

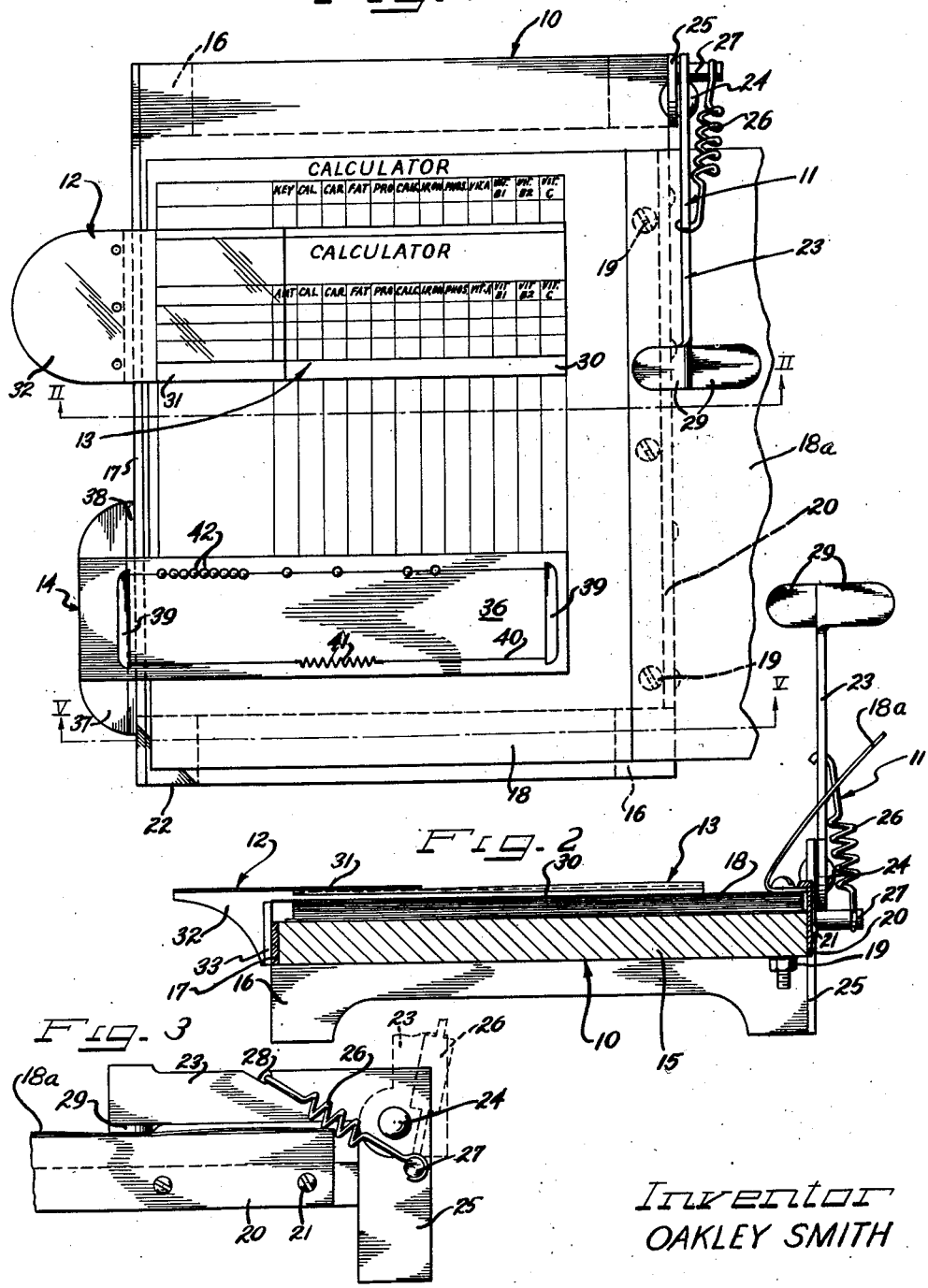

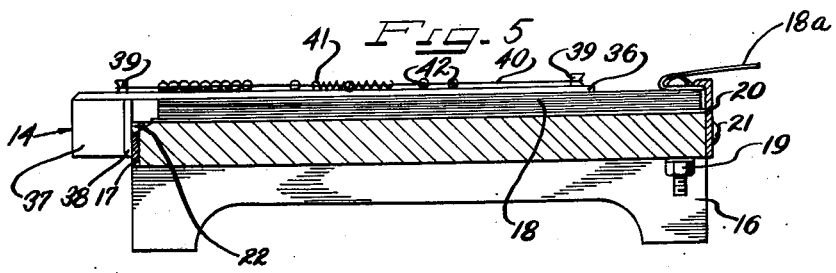

2,818,278

DEVICE FOR DETERMINING NUTRITIONAL FACTORS

Oakley Smith, Chicago, Ill.

Application September 9, 1954, Serial No. 454,943

5 Claims. (Cl. 281—1)

This invention relates to a posting device and calculator for the purpose of assisting the practitioner of naprapathy in quickly and accurately determining nutritional factors in various patients' cases, although the invention may have other uses and purposes as will be apparent to one skilled in the art.

The naprapath, in practicing the science of drugless healing, is faced with the problem of determining the dietary needs of a patient. In this phase of naprapathy, it is necessary to calculate the nutritional deficiencies in order to prescribe the proper remedies. Applicant has invented an apparatus for solving this problem and for performing the calculating operation quickly and accurately.

Accordingly it is an object of this invention to provide a posting device and calculator for the purpose of assisting the practitioner of naprapathy in quickly and easily determining nutritional factors in various patients' cases.

Another object of this invention is to provide a posting device and calculator which is quite economically constructed, highly efficient, extremely accurate, and rapidly and easily operated.

Still another object of this invention is the provision of a posting device and calculator including a sheet of paper having a plurality of various sized hingedly connected portions foldable upon one another without buckling of the sheet or overlapping the hinges.

A further object of this invention resides in the provision of a posting device and calculator including a sheet of paper having hingedly connected portions, wherein the hinge means may be effected by scoring or perforating the paper, or the portions may be taped together, such as by a transparent tape coated with a pressure sensitive adhesive.

Still another object of this invention is to provide a posting device and calculator having a sheet of paper with a series of transverse parallel disposed and increasingly spaced perforated lines serving as hinges.

Still another object of this invention resides in the provision of a posting device and calculator comprising a supporting table arranged to detachably accommodate a ledger, a pivotal lever on said table for holding open the ledger at a desired location, and a movable desk for receiving a data sheet from which data may be transferred to the ledger or on which data may be posted from said ledger.

Another object of this invention is to provide a posting device and calculator including a supporting table for a ledger, a desk and a marker slidably overlying said ledger, magnetic means for holding said desk and said marker in selected positions, wherein said marker functions to pin point certain columnar areas as desired on said ledger.

A further feature of this invention resides in the provision of a posting device and calculator to be used by the practitioner of naprapathy which comprises a sheet of paper foldable along progressively spaced perforated lines, said sheet of paper serving to record nutritional case histories of patients, a supporting table arranged to accommodate a classified catalogue of nutritional factors, a movable desk overlying said ledger for receiving said sheet of data in any foldable condition registering it with any selected page of said catalogue wherein the naprapath may, by a comparison system, quickly and accurately calculate the dietary needs of a patient.

Other objects, features, and advantages of this invention will be apparent from the following detailed description of one embodiment of the invention illustrated on the attached sheets of drawings which, by way of a preferred example only, illustrate the invention:

Figure 1 is a plan view of an assembly embodying the invention illustrating a data sheet mounted on a movable desk which slides relatively over the ledger or catalogue attached to the supporting table, and a movable marker;

Figure 2 is a vertical sectional view taken substantially along line II—II of Fig. 1;

Figure 3 is a fragmentary side elevational view showing the page hold-down means in its operative position;

Figure 4 is an enlarged plan view of the data sheet of this invention, having therealong information in printed form especially desirable for use by naprapaths in determining nutritional factors in patients' cases;

Figure 5 is a vertical cross sectional view taken substantially along line V—V of Fig. 1; and Figure 6 is a more or less schematic end view of the data sheet of Fig. 4 in its foldable state, illustrating the manner in which the sections are graduated in size so that the joints do not overlap each other.

Referring to Fig. 1, the main components of the posting device and calculator are generally indicated by numerals as follows: a supporting table 10 on which is detachably secured a catalogue, ledger, reference book, or the like; a page holdback 11 carried by said table 10 functioning to maintain a ledger or catalogue open at a predetermined point; a movable desk 12 slidable relative to the table 10; a foldable paper data sheet 13 received and supported by the movable desk 12; and a finder or marker 14 slidably supported by the table 10.

The table 10 includes a rectangular base member 15 supported at its top and bottom by legs 16 suitably attached thereto. In this instance, the base 15 and legs 16 are of wood, but other suitable materials, such as a metal or plastic, may be substituted therefor.

Detachably affixed to the top surface of the base 15 along its right hand margin is a ledger or reference catalogue 18 having a cover 18a, and in this instance, the catalogue contains nutritional values of various foods to be used by the practitioner of naprapathy in determining nutritional factors in various patients' cases. Nut and bolt assemblies 19 or the like are received in aligned apertures of the ledger 18 and the base member 15 along the outer side of the base allowing the easy removal or addition of ledger sheets, or the complete substitution of another ledger.

An elongated binding plate 20 is mounted coextensively along the outer side of the base member 15 by suitable fastening means 21, said plate carrying an overhanging flange functioning to further secure the ledger to the base plate 15.

To facilitate leafing of the ledger pages 18 which open toward the right, a sloping cut-out 22 is provided in the lower left-hand corner of the base member 15, as shown most clearly in Figs. 1 and 5, which allows the thumb or finger of the user to easily grasp a page or pages when opening the reference catalogue 18.

Referring now especially to Figs. 1, 2 and 3, the page hold-back 11 comprises an arm 23 pivotally mounted on a pin 24, which is in turn, outwardly projects from a mounting plate 25, the latter being suitably secured in a vertical position to the outer part of upper leg 16. An over center mounted spring 26, attached at one end to a pin 27 projecting laterally from the mounting plate 25 at the other end in a notch 28 of arm 23, selectively maintains the arm biased in a horizontal position as shown in Fig. 1 and in solid lines of Fig. 3, or in a vertical position as illustrated by Fig. 2 and the dotted lines of Fig. 3. Laterally extending from the free end of the arm 23 are finger engaging tabs or portions 29 to be engaged by the user in manipulating the page hold-back 11 from its operating to its non-operating position, and vice versa, the lower finger engaging tab 29 also aiding the arm 23 in maintaining the page or pages of the ledger 18 in their out-of-the-way positions. In Figures 1 and 3, the hold-back is shown restraining the ledger cover 18a.

Overlying the ledger 18 and the base 15 and slidably received thereby is the movable desk 12 which comprises a rectangular supporting portion 30 extending transversely across the ledger pages coacting in spaced laminar relation with an overlying transparent holddown plate 31 of glass or lucite or the like to loosely grip one end of the foldable paper data sheet 13. The transparent hold down plate 31 is considerably shorter than the supporting member 30 thereby facilitating easy removal and insertion of the paper sheet 13 while the elements also serve to properly orient the paper sheet in relation to the desk. A handle 32 projects inwardly from the supporting portion of the movable desk beyond the inner side of the base 15 and opposite from the direction in which the ledger pages are opened, and carrying a downwardly extending portion in which is securely mounted a suitable permanent magnet 33, which coacts with a ferromagnetic strip 17 suitably attached along the inner side of base 15, holding the movable desk in a suitable predetermined position for facilitating the transfer of data to or from the ledger 18.

The foldable paper data sheet 13, shown most clearly in Figs. 1, 2, 4 and 6, in this instance, represents a calculating sheet manipulated by the practitioner of naprapathy in determining nutritional factors in various patients' cases, although it is obvious that other uses may be made of this data sheet. In this case, the sheet is heavy rag paper, but other suitable paper may be used. As viewed in Fig. 4, the sheet 13 comprises a series of substantially parallel perforated or scored lines 34 transversely disposed on the sheet, and starting from the bottom of the sheet spaced progressively further apart operating as hinges connecting the various sized portions 35. Folding from the bottom the first portion is folded back against the upper portion 35, while those two portions are folded back against the succeeding upper portion, and so on until the sheet is completely folded as shown in Fig. 6, wherein it is seen that due to the spacing of the hinges 34, they are offset from one another preventing overlapping thereof and subsequent buckling of the sheet 13.

In operation, wherein the posting device and calculator is utilized in the profession of naprapathy, the data sheet 13 is linearly and columnarly marked to function as a calculating sheet. The top panel or portion 35 of the sheet contains the name of the patient as well as other pertinent personal data, which enables the naprapath to calculate the personal daily requirements regarding nutrition of the patient, the latter being inserted near the bottom of the page on the line designated "Personal D. R." and in the appropriately tilted columns. The classified catalogue containing nutritional values of various foods such as beverages, fruit, fish, fowl, meat, etc., is, in this instance, properly oriented and mounted on the base 15, and from this catalogue nutritional values are transferred or posted on the calculating sheet. Depending on where, in the catalogue, the proper information is to be obtained, the catalogue is opened and folded back, being held in that position by the page hold-back 11. The calculating sheet is then folded along one of the score lines 34, not necessarily as shown in Fig. 6, but according to the place where the data is to be posted on one of the plurality of parallel horizontal lines marked on the particular panel portion 35, and then is inserted in the laminated portion of the movable desk 12. The left-hand end of the sheet 13 strikes an abutment which indicates that the sheet has been properly oriented, wherein the columns of the sheet 13 register with the proper columns of the catalogue 18 as shown in Fig. 1. The movable desk 12 is then positioned by one hand, leaving the other free to manipulate a writing instrument or other device, wherein the bottom of the calculating sheet is directly adjacent to the desired data on the catalogue permitting it to be accurately posted on the calculating sheet 13 without contending with the labor consuming operation of looking at the heading of a page and following down along different columnar areas to the bottom of the page.

As already partially explained, due to the progressively different length portions 35, the sheet may be folded a number of ways allowing each portion to form a bottom of the calculating sheet, according to the manner of folding. The patient's nutritional values are then added and inserted along the line designated "Total." From this total and the personal daily requirements, the deficiency, termed "Offage," is figured, and then the corrective or remedial diet, termed "Neutro Plan," is calculated.

Although an example has been given illustrating the application of the posting device and calculator to the naprapathic profession, it is obvious that other uses are apparent such as in the field of bookkeeping where posting from a daily sheet to a ledger is necessary.

Sometimes it may be necessary or desirable in a process of bookkeeping or calculating to temporarily mark off a column or columns. For this reason, a finder or marker 14 is provided which comprises a rectangular plate member 36 overlying the ledger and extending transversely thereof, a handle 37 attached to one end of the base projecting downwardly thereof over the edge of table 10, as shown in Fig. 5, providing a guiding member, a suitable permanent magnet 38 positioned along the inner side of the handle 37 to coact with the ferromagnetic strip 17 in holding the finder 14 in a predetermined position, a pair of spaced parallel upstanding posts or flanges 39 around which is trained a suitable string of wire 40 having its free ends connected together by a coil spring 41 resiliently holding the wire 40 over the poles 39, and apertured beads 42 slidably received by the wire 40. One or more beads 42 may be positioned along the wire 40 serving to mark a selected columnar area, and then the marker may be moved up and down on the ledger to a suitable position as a bead 42 follows along a single column. In this case, the naprapath would, after determining certain nutritional deficiencies, mark the respective columnar areas with the beads 42 such as shown in Figure 1. Then by moving the marker up or down on the ledger, by virtue of the beads designating certain columns, he would easily locate foods or the like which contained the desired nutritional values. From these findings, the diet would be prescribed.

It will be understood that modifications and variations may be effected without departing from the scope of the novel concept of the present invention.

I claim as my invention:

1. In a device for use in naprapathic calculations or the like, the combination of a table arranged to accommodate a columnarly marked ledger, means for detachably securing said ledger along one vertical margin for opening back over said securing means, hold-back means for maintaining said ledger open at any desired point, a desk movably overlying said ledger, a columnarly marked data sheet selectively foldable along transverse parallel and increasingly spaced hinge means, said sheet being gripped by said desk wherein the columns of said sheet register with those of the ledger pages for quick and accurate transfer of data from the sheet to the ledger or from the ledger to the sheet, said desk carrying a handle at its end adjacent the free edges of said ledger pages, and means for maintaining said desk set in a selected position.

2. In a device of the character described, a base structure supporting thereon a superimposed series of data carrying leaves, means along one side of said base structure securing the adjacent edge portions of said leaves for hinged swinging manipulation toward and over said one side, means carried by said base structure for releasably holding the hingedly swung leaves against return, and a desk member including a panel slidably supported on the uppermost of the superimposed series of leaves for holding the same down and having means cooperating with means along the opposite side of said base structure for guiding the desk in a predetermined reciprocal path over a leaf upon which slidably superimposed, said desk extending from said opposite side and terminating short of said secured portion of said leaves and having thereon means for holding in position thereupon a sheet having means thereon for functional correlation with means on the sheet upon which the desk is superimposed, said reciprocal movement of the desk facilitating said correlation, said position holding means on the desk comprising a transparent panel arranged for laminar superimposed position on the desk-carried sheet and through which the surface of the desk-carried sheet is readily observable.

3. In a device of the character described, a base structure supporting thereon a superimposed series of data carrying leaves, means along one side of said base structure securing the adjacent edge portions of said leaves for hinged swinging manipulation toward and over said one side, means carried by said base structure for releasably holding the hingedly swung leaves against return, and a desk member including a panel slidably supported on the uppermost of the superimposed series of leaves for holding the same down and having means cooperating with means along the opposite side of said base structure for guiding the desk in a predetermined reciprocal path over a leaf upon which slidably superimposed, said desk extending from said opposite side and terminating short of said secured portion of said leaves and having thereon means for holding in position thereupon a sheet having means thereon for functional correlation with means on the sheet upon which the desk is superimposed, said reciprocal movement of the desk facilitating said correlation, said guiding means comprising a straight edge on said base structure and the desk having a depending flange slidably engaging said straight edge with a terminal portion of the desk projecting freely beyond said flange and serving as a handle for reciprocably manipulating the desk.

4. In a device of the character described, a base structure supporting thereon a superimposed series of data carrying leaves, means along one side of said base structure securing the adjacent edge portions of said leaves for hinged swinging manipulation toward and over said one side, means carried by said base structure for releasably holding the hingedly swung leaves against return, and a desk member including a panel slidably supported on the uppermost of the superimposed series of leaves for holding the same down and having means cooperating with means along the opposite side of said base structure for guiding the desk in a predetermined reciprocal path over a leaf upon which slidably superimposed, said desk extending from said opposite side and terminating short of said secured portion of said leaves and having thereon means for holding in position thereupon a sheet having means thereon for functional correlation with means on the sheet upon which the desk is superimposed, said reciprocal movement of the desk facilitating said correlation, said means for securing the adjacent edge portions of said leaves comprising a hold-down strip of generally inverted L-shaped cross-section with a short horizontal leg flange overlying the adjacent edge portions of the leaves and a vertical depending flange portion secured fixedly but releasably to the base structure.

5. In a device of the character described, a base structure supporting thereon a superimposed series of data carrying leaves, means along one side of said base structure securing the adjacent edge portions of said leaves for hinged swinging manipulation toward and over said one side, means carried by said base structure for releasably holding the hingedly swung leaves against return, and a desk member including a panel slidably supported on the uppermost of the superimposed series of leaves for holding the same down and having means cooperating with means along the opposite side of said base structure for guiding the desk in a predetermined reciprocal path over a leaf upon which slidably superimposed, said desk extending from said opposite side and terminating short of said secured portion of said leaves and having thereon means for holding in position thereupon a sheet having means thereon for functional correlation with means on the sheet upon which the desk is superimposed, said reciprocal movement of the desk facilitating said correlation, said base structure having underlying said leaves adjacent to said opposite side and running out at the edge of the base an undercut recess for facilitating engagement of the free edges of the leaves to turn the leaves.

References Cited in the file of this patent

UNITED STATES PATENTS

| | | |
|---|---|---|
| 146,623 | Wadsworth | Jan. 20, 1874 |
| 723,518 | Ellison | Mar. 24, 1903 |
| 943,195 | Lewis | Dec. 14, 1909 |
| 1,265,839 | Walden | May 14, 1918 |
| 1,548,690 | Swanberg | Aug. 4, 1925 |
| 2,163,193 | Critchfield | June 20, 1939 |
| 2,183,095 | Fleming | Dec. 12, 1939 |
| 2,520,854 | Pool | Aug. 29, 1950 |
| 2,630,335 | Griffin | Mar. 3, 1953 |

FOREIGN PATENTS

| | | |
|---|---|---|
| 507,331 | Belgium | Dec. 15, 1951 |

(Corresponding to Great Britain No. 723,229, Feb. 2, 1955)